May 26, 1970 — S. W. ALDERFER — 3,514,144
ELASTOMERIC ENERGY DISSIPATING BUMPER
Filed Nov. 1, 1967

INVENTOR
STERLING W. ALDERFER
BY Hamilton & Cook
ATTORNEYS

United States Patent Office 3,514,144
Patented May 26, 1970

3,514,144
ELASTOMERIC ENERGY DISSIPATING BUMPER
Sterling W. Alderfer, Akron, Ohio, assignor to Sterling Alderfer Company, Akron, Ohio, a corporation of Ohio
Filed Nov. 1, 1967, Ser. No. 679,922
Int. Cl. B60r *19/08;* B61f *19/04;* F16f *7/00*
U.S. Cl. 293—71                                6 Claims

ABSTRACT OF THE DISCLOSURE

A vehicle bumper for absorbing rather than merely storing energy. The bumper is constructed with a urethane elastomer body portion supported on a rigid backing plate. A distensible chamber is fully embedded within the body portion and completely filled with a non-compressible liquid.

BACKGROUND OF THE INVENTION

The present invention relates to a unique bumper construction and is most timely in view of the increasing emphasis on safety features by the automotive industry.

Bumpers were originally constructed in the form of a heavy metal bar, or bars, oriented transversely across the front and rear of the vehicle and supported from the frame to receive the shock of a collision and thus prevent damage from being sustained to the body of the vehicle. As functionality gave way to considerations of style, the bumper was incorporated more and more into the aesthetic design of the vehicle until today the bumper on many vehicles is a mere vestigial adornment.

Some attempts have been made to revitalize bumper constructions so that they may once again perform the office of protection. Most efforts in this area have been directed to protection of the vehicle itself with ill-conceived protection being afforded to the passengers.

In order fully to appreciate the relationship of the present invention to the prior art it is necessary to understand the nature of "impact" loading—that loading to which the bumper is primarily subjected and which it must withstand if it is to contribute measurably to the protection of the vehicle and its passengers.

The term "impact" implies that a blow is delivered to, or by, the bumper with appreciable velocity. As the velocity of the striking body is changed, there must occur a transfer of energy—i.e., work is done. Thus, the mechanics of impact involve not only the question of stresses induced but also a consideration of energy transfer, energy absorption and energy dissipation.

Energy is the capacity for doing work, and a moving body possesses kinetic energy by virtue of its motion. For translatory motion the kinetic energy of the moving body is the product of one-half the mass of the body multiplied by the square of the velocity. With prior known bumper constructions the energy of an impact loading resulted in elastic and/or plastic deformation of the bumper or its supporting members. When elastic deformation occurs one is faced with the problems incident to the storing of energy. With plastic deformation there is generally an initial elastic deformation and then the permanent deformation which is characteristic of plastic deformation.

The changeover point from elastic to plastic deformation is termed the elastic limit. The amount of energy received by a material under shock, or impact, loading up to the elastic limit and which is then returned by the material is called the elastic resilience. The energy stored by the material per unit of volume at the elastic limit is termed the modulus of resilience and is the elastic energy strength of the material.

After the original concept of securing bumpers rigidly to the frame of vehicles, which provided the entire energy of impact to the vehicle and its passengers, constructions were advanced which mounted the bumpers to the vehicle frame by springs. This construction insulates the vehicle and passengers during the initial impact—i.e., up to the elastic energy strength of the spring—but when that stored energy is released, the rebound so occasioned—i.e., a change in the direction of vehicular motion—may itself cause as much likelihood of injury to the passengers as the uncushioned original impact.

Although many ostensibly diverse constructions have been proposed for vehicle bumpers, most functionally resolve to an initial elastic deformation with a few attempting to dissipate the stored energy by the dampening action of controlled plastic deformation.

SUMMARY OF THE INVENTION

It is therefore a primary object of the present invention to provide a vehicular bumper construction that absorbs and dissipates impact energy rather than merely storing energy.

It is another object of the present invention to provide a bumper, as above, which is capable of absorbing the impact energy resulting from bringing an automobile moving at least up to five miles per hour to a collision stop.

It is a further object of the present invention to provide a bumper, as above, which accomplishes impact energy absorption by hysteresis.

These and other objects of the present invention, as well as the advantages thereof over existing and prior art forms, will be apparent in view of the following detailed description of the attached drawings and are accomplished by means hereinafter described and claimed.

In general, a bumper constructed according to the present invention has a rigid backing plate to which is secured a urethane elastomer body portion. A chamber, which is distensible and yet impervious to liquid, is embedded within the body portion to lie substantially coextensive therewith. This chamber is completely filled with a noncompressible liquid.

One preferred embodiment is shown by way of example in the accompanying drawings and is described in detail without attempting to show all of the various forms and modifications in which the invention might be embodied; the invention being measured by the appended claims and not by the details of the specification.

DESCRIPTION OF THE PREFERRED EMBODIMENT

Figure 1:
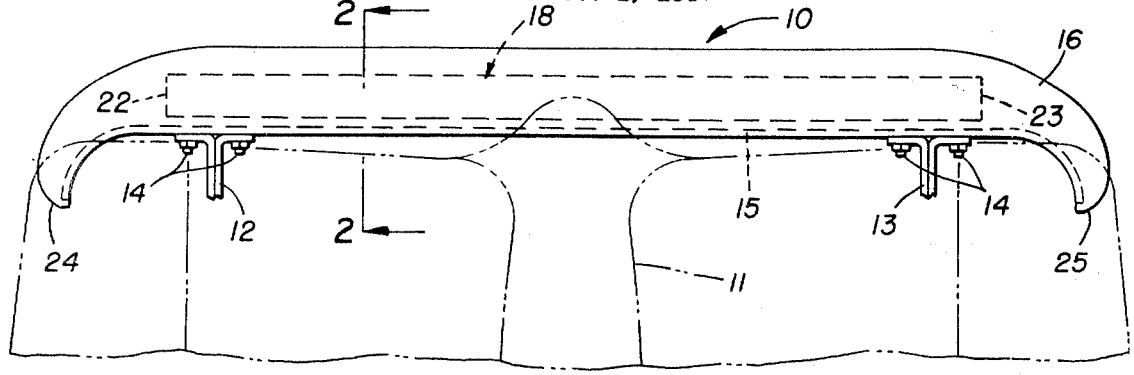
FIG. 1 is a top plan view of a bumper embodying the concept of the present invention environmentally depicted on the front of an automobile.

An improved bumper constructed in accordance with the concept of the present invention is designated generally by the numeral 10. The bumper 10 is mounted on the vehicle 11 by support arms 12 and 13 extending outwardly preferably from the frame of the vehicle 11. The support arms 12 and 13 are connected, as by bolts 14, to a rigid backing plate 15 secured within the rear of the body portion 16 of the bumper 10.

The body portion 16 is formed from a urethane elastomer. Urethane elastomers are produced through the reaction of certain polyisocyanates and polyhydroxy compounds to form a long chain, essentially linear macromolecule which is then chain extended and cross linked to complete the reaction. Conventional urethane elastomers are prepared by a casting method in which polyesters, polyisocyanates and chain extenders are mixed together in a liquid state at elevated temperatures and poured into molds. After a period of solidification the molds are opened and the solid, but uncured, elastomer is removed. Complete cure of this "green" material is accomplished by heating in ovens.

Recently this art has developed urethane elastomers that may be processed on standard extrusion, injection molding or transfer molding equipment. In any event urethane elastomers have outstanding abrasion, cut and tear resistance and are for that reason eminently suitable for use as a bumper. Additionally, it has been found that by distributing the impact energy throughout the mass of a urethane elastomer bumper the energy of impact can be fully dissipated by hysteresis without rebound through the desired speed range.

Encased within the body portion 16 is a chamber 18 having liquid impervious, distensible walls 19. The chamber 18 is completely filled with a noncompressible liquid 20.

Figure 2:
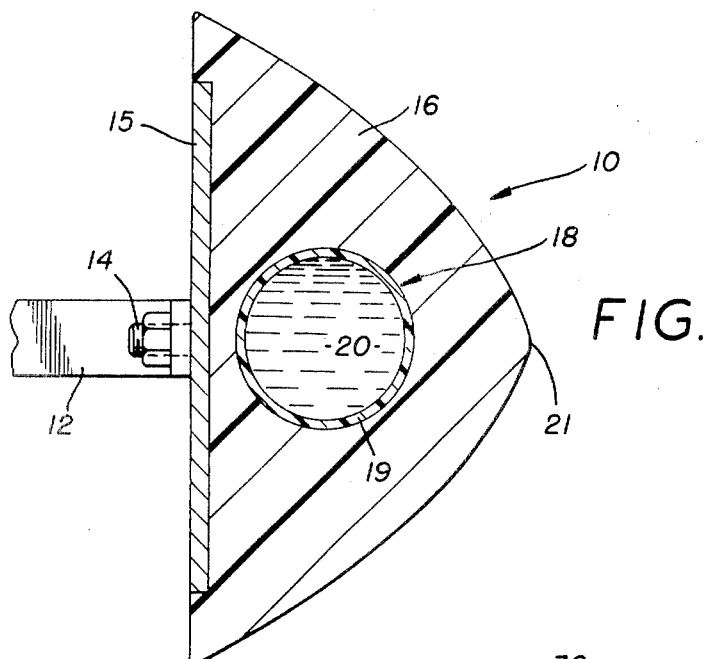
FIG. 2 is an enlarged cross section taken substantially on line 2—2 of FIG. 1.

As best shown in FIG. 2, the body portion 16 may have the cross-sectional profile of a parabola, the vertex 21 of which is located remotely of the backing plate 15. With such a cross-sectional profile the chamber 18 is preferably cylindrical. For ease of fabrication, and, to supply the necessary flexibility and yet be liquid impervious, the annular wall of chamber 18 may be made from a vinyl polymer. This thermoplastic material is liquid impervious, has excellent resistance to chemicals and provides the necessary wall strength to contain the noncompressible liquid 20 on impact loading. Moreover, it can be formulated to the desired flexibility by adding plasticizers, stabilizers or fillers, the addition of plasticizers increasing the flexibility of the material.

As shown in FIG. 1, the end walls 22 and 23 of the chamber 18 are spaced a moderate distance inwardly of the respective ends 24 and 25 of the body portion 16. Thus, while the chamber 18 is completely surrounded by the urethane elastomer of the body portion 16 so as to be fully embedded therein, the chamber 18 is nevertheless substantially coextensive with the body portion 16.

While any noncompressible liquid 20 will suffice, inasmuch as the bumper 10 may be used in climates where the temperature will fall below freezing a material such as polyglycol, or other antifreeze, is recommended.

Figure 3:
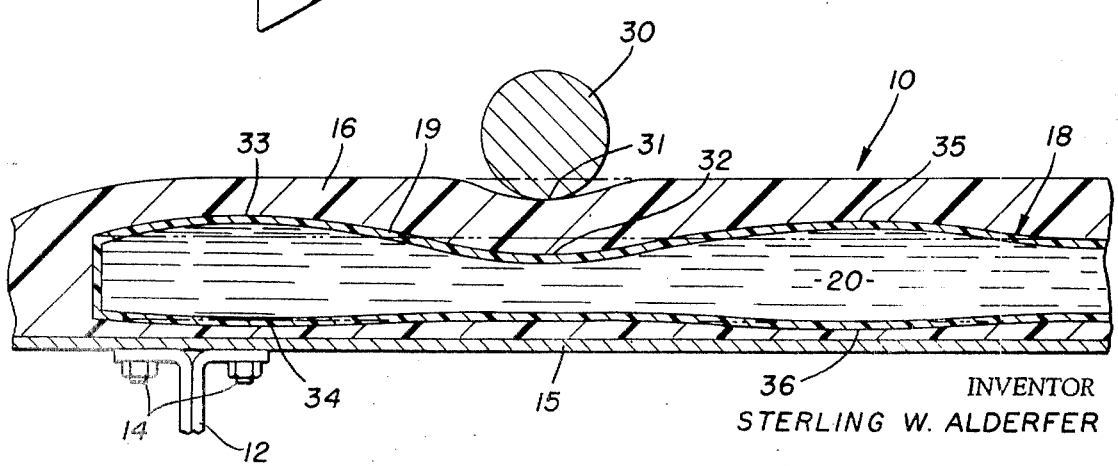
FIG. 3 is an enlarged horizontal section of a portion of the bumper, as shown in FIG. 1, depicting the effect of an impact load imparted by collision with a vertical object.

Reference to FIG. 3 discloses the operation of bumper 10 in dissipating impact energy. Even if the object 30 with which the bumper 10 collides is of such dimension that the full energy of impact is localized over a small contact area 31 on bumper 10, the distortion of the body portion 16 under the impact of object 30 is telegraphed to the chamber 18 which constricts beneath the blow, as represented by depression 32. The fluid 20 within chamber 18, being noncompressible, will maintain a constant volume so that a constriction of chamber 18 at 32 occasions a corresponding distension elsewhere, as represented by the expansion of wall 19 radially outwardly of its normal position (depicted in chain line) at points 33, 34, 35 and 36. The energy of impact is thereby distributed throughout the body portion 16 of bumper 10. In order to assure that the impact loading will compress the urethane elastomer body portion 16, it is necessary that the backing plate 15 be sufficiently rigid to withstand the impact which the bumper is designed to dissipate without itself suffering undue elastic or plastic deformation.

With a bumper of modest dimension the energy of impact for a heavy automobile traveling at five miles per hour can be fully dissipated by this construction. For example, a bumper approximately 23" in length having a body portion 16 extending slightly more than 2⅓" between the backing plate 15 and the vertex 21 with a greatest transverse dimension of 4½" and containing a chamber 18 approximately 1¼" in diameter filled with polyglycol will fully dissipate the energy of impact caused by suddenly stopping a passenger automobile traveling at five miles an hour.

Because the energy of impact increases in direct proportion to the square of the velocity, it must be realized that the dissipation of energy for every additional mile per hour of speed is an exceptional gain. It should now be apparent that a bumper embodying the concept of the present invention absorbs and dissipates rather than stores impact energy and thus accomplishes the objects of the invention.

What is claimed is:

1. A vehicle bumper for dissipating impact energy comprising, an elongated body portion, said body portion being a urethane elastomer which on being distorted dissipates the distoring energy by hysteresis, a chamber fully encased within and extending throughout the length of said body portion, said chamber being distensible and impervious to liquid, a noncompressible liquid completely filling said chamber so that distortion of the body portion at a point of impact on the body portion distends the chamber therein to distribute the impact energy throughout the body portion.

2. A bumper, as set forth in claim 1, having a rigid backing plate secured thereto.

3. A bumper, as set forth in claim 2, in which the chamber, though fully embedded within said body portion, is substantially coextensive with said body portion.

4. A bumper, as set forth in claim 3, in which the noncompressible liquid contained in said chamber is an antifreeze.

5. A bumper, as set forth in claim 4, in which the cross-sectional profile of said body portion is generally parabolic.

6. A bumper, as set forth in claim 5, in which said chamber is substantially cylindrical.

References Cited

UNITED STATES PATENTS

| 1,402,324 | 1/1922  | Van Gelder | 293—71  |
| 1,558,332 | 10/1925 | Basch      | 293—71  |
| 1,784,387 | 12/1930 | Postel     | 180—92  |
| 2,890,904 | 6/1959  | Materi     | 293—71  |
| 3,284,122 | 11/1966 | Rich       | 293—60  |
| 2,902,072 | 9/1959  | Reuter     | 152—330 |

ARTHUR L. LA POINT, Primary Examiner

H. BELTRAN, Assistant Examiner

U.S. Cl. X.R.

152—330; 180—92; 207—140; 293—60, 72